United States Patent Office 3,522,986
Patented Aug. 4, 1970

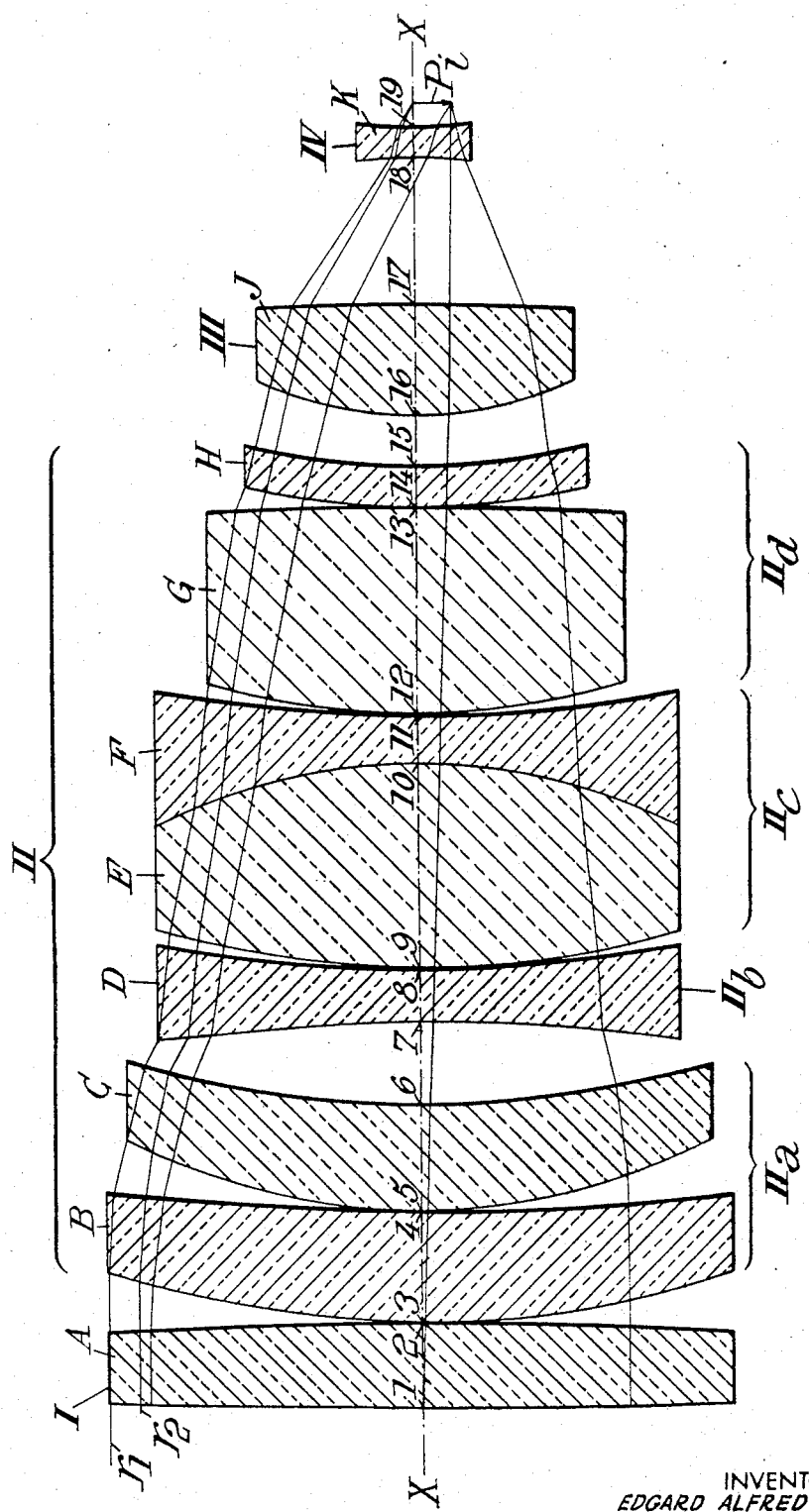

3,522,986
REPRODUCTION OBJECTIVE
Edgard Alfred Hugues, Courbevoie, France, assignor to Commissariat a l'Energie Atomique, Paris, France
Filed Jan. 26, 1968, Ser. No. 700,782
Claims priority, application France, Jan. 30, 1967, 93,066
Int. Cl. G02b *3/00, 9/00*
U.S. Cl. 350—214           2 Claims

ABSTRACT OF THE DISCLOSURE

The objective comprises: a first lens group having a lens of low power and a high refractive index; a second lens group, practically afocal, having seven lenses adapted to correct progressively the aberrations introduced by the third lens group; a third lens group whose lens, of high refractive index, determines the power of the objective; and a fourth lens group whose lens, of low refractive index, corrects the curvature of the field and the Petzval curvature.

---

The present invention relates to reproduction objectives, that is to say to objectives intended for the reproduction of plans, documents, drawings, etc. The invention is more particularly, but not exclusively, concerned with objectives of this type which have a given magnification (lower than 1) and which are intended to produce reduced images with an excellent definition, in particular for making printed circuits of small dimensions or microcircuits of the integrated circuits type and microfilms of substandard format (smaller than 35 millimeters (mm.)).

An object of the present invention is to provide reproduction objectives having good definition, due to the elimination of the various aberrations, and having a large aperture.

According to the present invention, a high definition reproduction objective, having a large aperture and a given magnification, is characterized by the fact that it comprises, in combination, four groups of lenses, namely, from the object to the image:

A first group formed by a single lens of low power and high refractive index, which determines the magnification (lower than 1) of the reproduction, this lens being preferably removable in order to permit its replacement by a lens of the same type but determining a different magnification;

A second group, practically afocal (without power), of about seven lenses intended to correct progressively the aberrations introduced by the lens or lenses of the third group;

A third group, formed with a single lens or possibly two lenses, which determines the power of the objective, the focal length of this group being slightly smaller than the focal length chosen for the objective;

A fourth group formed by a single divergent lens, of low index of refraction, placed in the neighbourhood of the image plane of the objective and intended to correct the curvature of the field and the Petzval curvature.

This invention is particularly applicable to objectives having a magnification of the order of $1/10$ and an aperture $n$ sine $\omega$ of the order of 0.50 for the manufacture of microcircuits.

The invention will be well understood from the following description, given merely by way of example, with reference to the accompanying drawing.

In this drawing, the single figure represents in section the lenses of an objective constructed according to the present invention, showing the paths of a certain number of luminous rays (shown in solid lines) at a greater or lesser distance from the optical axis (shown in a dot-dash line).

The objective shown in the drawing has a very large aperture ($n$ sine $\omega=0.50$), a given magnification of $1/10$ and an average definition, in a field of 3.5 mm. diameter, of 1500 lines/mm. for the $g$ line of mercury (of wave length 4358 angstroms). This objective comprises four groups I, II, III, IV of lenses of common optical axis XX, namely, from the object plane (not shown) to the image plane $P_1$.

First of all, a first group I formed by a single lens A (limited by the surfaces 1 and 2) of low power (its focal length being 305 mm. for an object situated at 300 mm. from the front surface 1 of this lens) of high refractive index (1.8 for the D line of sodium of wave length 5876 angstroms, all the refractive indexes being indicated for this line) so that this lens introduces only the minimum of aberrations. The lens A, which determines the magnification (equal to 0.1) of the reproduction, permits the rest of the objective (groups II, III and IV) which follows it (in the direction of travel of the luminous rays) to operate as if it were operating for an object situated at infinity, due to the fact that the object to be reproduced is substantially in its object focal plane. The magnification of the objective can thus be changed by substituting for the lens A, which is thus preferably removable, an analogous lens having a different focal length.

The objective comprises next a second group II of lenses which is a practically afocal group, that is to say without power, formed advantageously by seven lenses B, C, D, E, F, G, H (limited by the surfaces 3 to 15 as shown) intended to correct progressively the aberrations introduced by the lens J of the third group III which is a convergent group. The high number (of the order of seven) of lenses of the second group permits progressive corrections to be made resulting in an objective of quality, which would not be possible if a corrective group were used having a small number of lenses operating at the limit of their possibilities for achieving large corrections. The lenses of the second group correct in particular the anti-nodes of spherical aberration and of curvature of the field, the variations of coma between the edge of the field and the $2/3$ field. These lenses can be grouped in four successive sub-groups II$a$, II$b$, II$c$, II$d$, namely:

A first sub-group II$a$ comprising two lenses B and C of rather high refractive index (1.72) intended to correct in part the spherical aberration and the curvature of the field; these lenses have focal lengths of 98 and 78 mm. respectively; each of these lenses works at an average aperture of F/3 about; in variations, the lenses B and C can be grouped in a single lens, thus decreasing the aperture of the overall objective, or on the contrary, a third lens can be added to the lenses B and C (the three-lens sub-group having the same power as the original two-lens sub-group II$a$), which would permit the aperture of the objective to be increased;

A second sub-group II$b$ formed by a single lens D, which is biconcave hence divergent, of focal length 78.1 mm. which permits a correction of the spherical aberration and of the external coma while improving the Petzval curvature;

A third sub-group II$c$ of very low power (focal length—2,219.7 mm.) having two lenses E and F cemented together; the difference between the Abbé numbers (60 and 28) of the two lenses E and F permits the chromatic aberrations to be corrected, whereas the difference between the refractive indexes (1.620 and 1.731) of the two lenses permits, due to the curvature of the cemented surface of these two lenses, a correction of the zonal of spherical aberrations;

A fourth sub-group II$d$ having two lenses G and H achieves the correction of spherical aberrations and of a part of the external coma introduced by the lens D; by way of a variation, the lens G, of glass of refractive index 1.62025, could be chromatized with a lens of glass of the same refraction index and of different Abbé number, which will improve the chromatism of the whole.

Next the objective comprises a third group III formed by a single lens J (between the surfaces 16 and 17) which determines the power of the objective, the focal length (23.23 mm.) of this lens being slightly smaller than the focal length chosen for the objective (26.7 mm.). The lens J is of a glass of high refractive index (1.8). The aberrations that it brings, due to its considerable convergence, are practically all compensated by the lenses of the second group II. By way of a variation, this single lens J could be substituted by two lenses in order to increase the aperture of the overall objective, the group of two lenses also having a focal length slightly smaller than the focal length chosen for the objective.

Finally, the objective comprises a fourth group IV formed by a single divergent lens K (limited by the surfaces 18 and 19), of low refractive index (1.516), placed in the neighbourhood of the image plane $P_i$ of the objective and intended to correct the curvature of the field and the Petzval curvature of the objective.

In the drawing, the paths of a few rays have been shown, including the rays $r_1$ at F/0.87 and $r_2$ at F/0.97 when the objective works at infinity, for the wave length 4358 angstroms ($g$ line of mercury).

The characteristics of such an objective, constructed by way of a prototype, are given in the following table:

| Lens | Surfaces | Thickness in mm. | Radius of curvature in mm. | Refractive index for the D line of sodium | Abbé number | Diameter of the lens in mm. |
|---|---|---|---|---|---|---|
| A | 1 | 4.00 | 785.500 | 1.8 | V=46 | 30 |
|   | 2 |      | −368.850 |     |      |    |
|   |   | 0.10 |          | air |      |    |
|   | 3 |      | 50.605   |     |      |    |
| B |   | 5.27 |          | 1.72 | V=50 | 30 |
|   | 4 |      | 160.430  |     |      |    |
|   |   | 0.065 |         | air |      |    |
|   | 5 |      | 32.221   |     |      |    |
| C |   | 4.82 |          | 1.72 | V=50 | 28 |
|   | 6 |      | 68.325   |     |      |    |
|   |   | 4.05 |          |     |      |    |
|   | 7 |      | −134.680 |     |      |    |
| D |   | 2.24 |          | 1.73150 | V=28 | 25 |
|   | 8 |      | 108.420  |     |      |    |
|   |   | 0.065 |         | air |      |    |
|   | 9 |      | 60.033   |     |      |    |
| E |   | 9.50 |          | 1.62025 | V=60 | 23.5 |
|   | 10 |     | −25.683  |     |      |    |
| F |   | 2.20 |          | 1.73150 | V=28 | 23.5 |
|   | 11 |     | 115.444  |     |      |    |
|   |   | 0.065 |         | air |      |    |
|   | 12 |     | 68.80    |     |      |    |
| G |   | 9.48 |          | 1.62025 | V=60 | 20 |
|   | 13 |     | −1235.8  |     |      |    |
|   |   | 0.065 |         | air |      |    |
|   | 14 |     | 38.907   |     |      |    |
| H |   | 1.80 |          | 1.62025 | V=36 | 16 |
|   | 15 |     | 32.593   |     |      |    |
|   |   | 2.51 |          | air |      |    |
|   | 16 |     | 20.138   |     |      |    |
| J |   | 4.70 |          | 1.8 | V=46 | 13.2 |
|   | 17 |     | −344.900 |     |      |    |
|   |   | 7.05 |          | air |      |    |
|   | 18 |     | −13.652  |     |      |    |
| K |   | 1.50 |          | 1.51650 | V=64 | 4.7 |
|   | 19 |     | 55.830   |     |      |    |

The objective according to the preceding table, which corresponds to the drawing, has been especially studied for the $g$ line of mercury (of wave length 4358 angstroms) for which the definition is the best (as indicated previously, the average definition of the objective, in a field of 3.5 mm. diameter, is 1500 lines/mm. for the $g$ line of mercury).

The chromatic correction has been made about the $g$ line in a manner such that the $h$ line (of wave length 4047 angstroms) is bent back onto the $f$ line (4861 angstroms):

$g-f=0.010$ mm.
$g-h=0.010$ mm.

Nevertheless, in view of the aperture of the objective and the desired definition, it is not possible to use the objective for so wide a pass band without reducing the definition.

The characteristics of the objective described above are the following:

focal length: 26.747 mm.
draw length from the objective to infinity: −1.596
magnification: −0.0995
distance from the object to surface 1: −300
distance from the image to surface 19: 1.0665

This reproduction objective has, with respect to reproduction objectives in the prior art, numerous advantages, in particular the following:

First of all, it has an excellent definition.
Its aperture is very large.
The different aberrations are systematically corrected.
It permits printed microcircuits to be manufactured in a very precise manner.

Although the invention has been specifically described with reference to the preferred embodiment, the invention is not intended to be limited thereto as there could be various changes made without departing from the spirit or the scope of the invention.

What I claim is:

1. An unsymmetrical objective for high definition reproduction, having a large aperture and a given magnification less than 1, comprising, in combination, four groups of lenses disposed along a common optical axis, namely, from the object to the image, a first group, a second group, a third group and a fourth group,
    said first group being formed by a single lens of low power and high refractive index, said single lens determining the magnification of the reproduction, and being mounted removably to permit its replacement by another lens of the same type but determining a different magnification;
    said second group being substantially afocal, and formed by four successive subgroups, namely:
        a first convergent sub-group comprising two lenses, of rather high index of refraction, correcting in part the spherical aberration and the curvature of the field;
        a second very divergent sub-group formed by a single biconcave lens correcting the spherical aberration and the external coma;
        a third slightly divergent sub-group of very low power having two lenses cemented together, these two cemented lenses having different Abbé numbers and different indexes of refraction to correct the chromatic aberrations and the zonal of spherical aberrations;
        a fourth convergent sub-group having two lenses correcting the spherical aberrations and a part of the external coma;
    said third group being formed by at most two lenses, and determining the power of the objective, the focal length of said third group being slightly smaller than the focal length chosen for the objective as a whole;
    said fourth group being formed by a single divergent lens, of low index of refraction and placed in the neighbourhood of the image plane of the objective, for correcting the curvature of the field and the Petzval curvature.

2. An objective according to claim 1, having the following characteristics:

focal length: 26.747 mm.
draw length from the objective to infinity: −1.596
magnification: −0.0995
distance from the object to surface 1: −300
distance from the image to surface 19: 1.0665 in which the lenses are defined by the following table:

| Lens | Surfaces | Thickness in mm. | Radius of curvature in mm. | Refractive index for the D line of sodium | Abbé number | Diameter of the lens in mm. |
|---|---|---|---|---|---|---|
| A | 1 | 4.00 | 785.500 | 1.8 | V=46 | 30 |
|   | 2 | 0.10 | −368.850 | air |  |  |
| B | 3 | 5.27 | 50.605 | 1.72 | V=50 | 30 |
|   | 4 | 0.065 | 160.430 | air |  |  |
| C | 5 | 4.82 | 32.221 | 1.72 | V=50 | 28 |
|   | 6 | 4.05 | 68.325 | air |  |  |
| D | 7 | 2.24 | −134.680 | 1.73150 | V=28 | 25 |
|   | 8 | 0.065 | 108.420 | air |  |  |
| E | 9 | 9.50 | 60.033 | 1.62025 | V=60 | 23.5 |
| F | 10 | 2.20 | −25.683 | 1.73150 | V=28 | 23.5 |
|   | 11 | 0.065 | 115.444 | air |  |  |
| G | 12 | 9.48 | +68.80 | 1.62025 | V=60 | 20 |
|   | 13 | 0.065 | −1235.8 | air |  |  |
| H | 14 | 1.80 | 38.907 | 1.62025 | V=36 | 16 |
|   | 15 | 2.51 | 32.593 | air |  |  |
| J | 16 | 4.70 | 20.138 | 1.8 | V=46 | 13.2 |
|   | 17 | 7.05 | −344.900 | air |  |  |
| K | 18 | 1.50 | −13.652 | 1.51650 | V=64 | 4.7 |
|   | 19 |  | 55.830 |  |  |  |

References Cited

UNITED STATES PATENTS

| 2,481,639 | 9/1949 | Altman et al. | 350—214 X |
| 3,014,406 | 12/1961 | Back | 350—214 X |
| 3,152,210 | 10/1964 | Gustafson | 350—212 |
| 3,034,404 | 5/1962 | Laurent. | |
| 3,394,975 | 7/1968 | Coniglio. | |
| 3,428,386 | 2/1969 | Schlegel. | |
| 3,428,390 | 2/1969 | Rosenberger. | |

FOREIGN PATENTS

| 48,057 | 1966 | Germany. |
| 1,180,964 | 1964 | Germany. |

DAVID SCHONBERG, Primary Examiner

P. A. SACHER, Assistant Examiner

U.S. Cl. X.R.

350—212